（12）United States Patent
Woo

(10) Patent No.: US 8,581,955 B2
(45) Date of Patent: Nov. 12, 2013

(54) APPARATUS AND METHOD FOR REMOTE CONTROL BETWEEN MOBILE COMMUNICATION TERMINALS

(75) Inventor: Sang-Wook Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 13/077,129

(22) Filed: Mar. 31, 2011

(65) Prior Publication Data

US 2011/0242267 A1  Oct. 6, 2011

(30) Foreign Application Priority Data

Mar. 31, 2010  (KR) .................. 10-2010-0029055

(51) Int. Cl.
*H04N 7/14* (2006.01)
(52) U.S. Cl.
CPC ....................................... *H04N 7/14* (2013.01)
USPC .................. 348/14.02; 348/14.01; 348/14.03
(58) Field of Classification Search
CPC ..................... H04M 1/72525; H04M 1/72533; H04M 1/72552; H04N 8/345; H04N 7/15
USPC ............ 348/14.01–14.16; 455/420, 418, 419, 455/423, 428; 709/208
See application file for complete search history.

(56) References Cited

U.S. PATENT DOCUMENTS

| 2002/0021352 A1* | 2/2002 | Sato ........................... 348/14.02 |
| 2007/0254640 A1* | 11/2007 | Bliss ............................. 455/420 |
| 2007/0281679 A1* | 12/2007 | Rodriguez et al. ............ 455/420 |
| 2008/0246830 A1* | 10/2008 | Martin et al. .............. 348/14.02 |
| 2009/0298469 A1* | 12/2009 | Kim et al. ..................... 455/411 |

* cited by examiner

*Primary Examiner* — Melur Ramakrishnaiah

(57) ABSTRACT

An apparatus and method in a mobile terminal support remote control with other mobile terminals. A video call is connected between the mobile terminal with a corresponding terminal. A remote control request message is transmitted through a control channel to the corresponding terminal. A remote control acceptance message is received through the control channel from the corresponding terminal. And a control message including control data that corresponds to a user input is transmitted through the control channel to the corresponding terminal.

20 Claims, 5 Drawing Sheets

| LENGTH (1byte) | SEQUENCE NUMBER (1byte) | KEY TYPE (2bit) | DRAG (1bit) | DRAG START/END (1bit) | COORDINATE OR KEY VALUE (VARIABLE LENGTH) |
|---|---|---|---|---|---|
| 201 | 203 | 205 | 207 | 209 | 211 |

APPARATUS AND METHOD FOR REMOTE CONTROL BETWEEN MOBILE COMMUNICATION TERMINALS

CROSS-REFERENCE TO RELATED APPLICATION(S) AND CLAIM OF PRIORITY

The present application is related to and claims priority under 35 U.S.C. §119 to an application filed in the Korean Intellectual Property Office on Mar. 31, 2010 and assigned Serial No. 10-2010-0029055, the contents of which are incorporated herein by reference.

TECHNICAL FIELD OF THE INVENTION

The present invention relates generally to an apparatus and method for remote control between mobile communication terminals and, in particular, to an apparatus method for remote control between mobile communication terminals with different user interfaces.

BACKGROUND OF THE INVENTION

Mobile terminals providing various additional functions have been launched with the rapid development of mobile communication systems. However, the old or the blind have difficulty in controlling the mobile terminals, and use only some of the various additional functions. For example, the old or the blind use only a call function.

Accordingly, a scheme for remotely controlling a corresponding terminal through a mobile terminal in a video call mode is provided for the users experiencing difficulty when normally using additional functions of mobile terminals. The video call-based remote control scheme uses a T.120 data channel of H324M to perform a control between terminals. That is, when a mobile terminal creates an initial H324M session with a corresponding terminal, the mobile terminal exchanges H245 control information with the corresponding terminal to determine whether the corresponding terminal supports the T.120 data channel. If the corresponding terminal supports the T.120 data channel, the mobile terminal may remotely connect to the corresponding terminal through a process of exchanging remote control request/acceptance messages with the corresponding terminal. Herein, the corresponding terminal transmits its LCD buffer to the mobile terminal, and the mobile terminal displays the same image as the image displayed on the screen of the corresponding terminal. The mobile terminal receives a key inputted by the user to control the corresponding terminal, and transmits the inputted key through the T.120 data channel to the corresponding terminal. Then, the corresponding terminal performs an operation corresponding to the received key and transmits the LCD buffer updated according to the operation to the mobile terminal to notify the operation result according to the received key.

The conventional video call-based remote control scheme is performed through a T.120 data channel. Thus, if either of the two mobile terminals does not support the T.120 data channel, it is impossible to use the video call-based remote control scheme. The 3G-H324M implemented in the 3G network cannot use the video call-based remote control scheme because it does not include a data channel.

In addition, current mobile terminals have different user interfaces. For example, the mobile terminals have LCD screens of different sizes and have different input units (e.g., touchscreens and keypads). However, because the conventional video call-based remote control scheme does not support different user interfaces, it cannot be used between mobile terminals with different user interfaces.

SUMMARY OF THE INVENTION

An object of the present invention is to substantially solve at least the above problems and/or disadvantages and to provide at least the advantages below. Accordingly, an object of the present invention is to provide an apparatus and method for remote control between mobile terminals.

Another object of the present invention is to provide an apparatus and method for remotely controlling another mobile terminal in a mobile terminal by using a control channel.

Another object of the present invention is to provide an apparatus and method for remotely controlling another mobile terminal through a video call in a mobile terminal that does not support a H.324M data channel.

Another object of the present invention is to provide an apparatus and method for remote control between mobile terminals that have different screen resolutions.

Another object of the present invention is to provide an apparatus and method for remote control between mobile terminals that include different input units.

According to an aspect of the present invention, a method for performing a remote control in a mobile terminal is provided. A video call is connected with a corresponding terminal. A remote control request message is transmitted through a control channel to the corresponding terminal. A remote control acceptance message is received through the control channel from the corresponding terminal. And a control message including control data that corresponds to a user input is transmitted through the control channel to the corresponding terminal.

According to another aspect of the present invention, a method for undergoing a remote control in a mobile terminal is provided. A video call is connected with a corresponding terminal. A remote control request message is received through a control channel from the corresponding terminal. A remote control acceptance message is transmitted through the control channel to the corresponding terminal. A control message including control data that corresponds to a user input is received from the corresponding terminal through the control channel. And an operation corresponding to the control data is performed.

According to another aspect of the present invention, an apparatus for performing a remote control in a mobile terminal is provided. A communication unit connects a video call with a corresponding terminal. And a control unit transmits a remote control request message through a control channel to the corresponding terminal, and transmits a control message including control data that corresponds to a user input through the control channel to the corresponding terminal in responds to receiving a remote control acceptance message through the control channel from the corresponding terminal.

According to another aspect of the present invention, an apparatus for undergoing a remote control in a mobile terminal is provided. The apparatus includes a communication unit and a control unit. The communication unit connects a video call with a corresponding terminal. And the control unit receives a remote control request message through a control channel from the corresponding terminal, transmits a remote control acceptance message through the control channel to the corresponding terminal, receives a control message including control data that corresponds to a user input through the control channel, and performs an operation corresponding to the control data.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which:

FIG. 2 illustrates a format of a control message for remotely controlling a corresponding mobile terminal in a mobile terminal according to an embodiment of the present invention;

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication device. Preferred embodiments of the present invention will be described below, with reference to the accompanying drawings. In the following description, detailed descriptions of well-known functions or configurations will be omitted as they would unnecessarily obscure the subject matters of the present invention.

The present invention provides an apparatus and method for remote control between mobile terminals.

Figure 1:
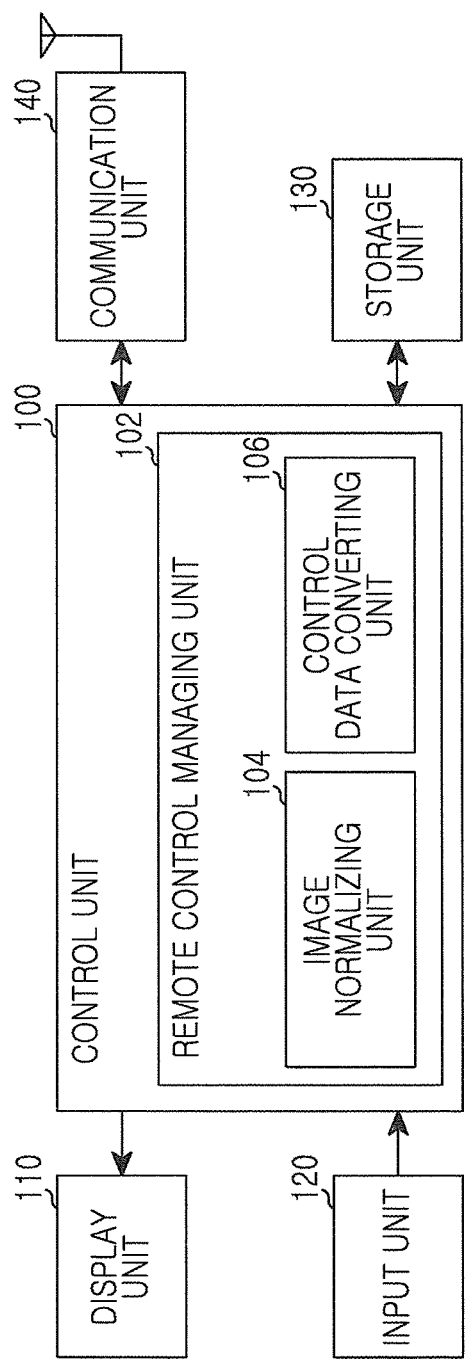
FIG. 1 is a block diagram of a mobile terminal according to an embodiment of the present invention.

FIG. 1 is a block diagram of a mobile terminal according to an embodiment of the present invention.

Referring to FIG. 1, the mobile terminal includes a control unit 100, a display unit 110, an input unit 120, a storage unit 130, and a communication unit 140. The control unit 100 includes a remote control managing unit 102. The remote control managing unit 102 includes an image normalizing unit 104 and a control data converting unit 106.

The control unit 100 controls an overall operation of the mobile terminal. According to the present invention, the control unit 100 uses the remote control managing unit 102 to remotely control a corresponding terminal in a video call mode or to undergo a remote control from the corresponding terminal.

When a remote control event for the corresponding terminal occurs after a video call connection with the corresponding terminal, the remote control managing unit 102 controls a function for transmitting a remote control request message to the corresponding terminal. When a remote control acceptance message is received from the corresponding terminal through the communication unit 140, the remote control managing unit 102 analyzes the remote control acceptance message to detect a user interface (UI) of the corresponding terminal. Also, when a remote control request message is received from the corresponding terminal after the video call connection, the remote control managing unit 102 controls a function for transmitting a remote control acceptance message under the control of a user. Herein, the remote control request message and the remote control acceptance message include screen resolution information and input type information of the terminal as illustrated in Table 1. Herein, the input type information indicates an input unit for inputting data into the terminal, which includes at least one of a keypad and a touch sensor.

TABLE 1

| Purpose | Object ID | |
|---|---|---|
| | Object (1 byte) | Data |
| Remote Connection Request | 911 | Device Resolution Information, Input Type (Keypad, Touch Sensor) |
| Remote Connection Acceptance | 912 | Device Resolution Information, Input Type (Keypad, Touch Sensor) |
| Control Data Transmission | 913 | Control Information (Touch Coordinates, Drag or not, Input Key) |

Table 1 is an example of messages that are communicated for a remote control during a video call. As illustrated in Table 1, each message may use an OID (Object ID) predefined on the basis of a UII (User Input Indication) supported in the H245 standards. Herein, each message in Table 1 may be communicated over a control channel according to an embodiment of the present invention.

For a remote control of the corresponding terminal, the remote control managing unit 102 compares the input type of the corresponding terminal and the input type of the mobile terminal to determine whether the input type of the corresponding terminal is identical to the input type of the mobile terminal. If the input type of the corresponding terminal is not identical to the input type of the mobile terminal, the remote control managing unit 102 controls a function for displaying an interface for the input type of the corresponding terminal on the display unit 110. For example, if the input type of the corresponding terminal is a keypad and the input type of the mobile terminal is a touch sensor, a keypad (e.g., a 3×4 keypad or a QWERTY keypad) of the corresponding terminal may be displayed on the display unit 110. If the input type of the corresponding terminal is a touch sensor and the input type of the mobile terminal is a keypad, a pointer may be displayed on a screen of the display unit 110.

The remote control managing unit 102 receives data inputted through the input unit 120, generates a control message including control data for a remote control of the corresponding terminal, and transmits the control message to the corresponding terminal. Herein, as illustrated in FIG. 2, the control message may include a Length field 201 indicating the total data length, a Sequence Number field 203 indicating the message order, a Key Type field 205 indicating the input type of the terminal, a Drag field 207 indicating the occurrence/nonoccurrence of a drag, a Drag Start/End field 209 indicating the start or end of a drag, and an (x, y) Coordinate or Key Value field 211 indicating actual data inputted by the user. Herein, if the input type of the corresponding terminal is different from the input type of the mobile terminal, the remote control managing unit 102 uses the control data converting unit 106 to convert actual data inputted by the user into data of the input type of the corresponding terminal. For example, when the input type of the corresponding terminal is a keypad and the input type of the mobile terminal is a touch sensor, if a keypad of the corresponding terminal is displayed on the display unit 110, the mobile terminal does not generate the coordinates of a touch position as actual data through the touch sensor, but rather generates a key of the keypad corresponding to the touch position as actual data to be included in the control message. In contrast, when the input type of the corresponding terminal is a touch sensor and the input type of the mobile terminal is a keypad, if a pointer is displayed on a screen of the display unit 110, the mobile terminal does not generate the data inputted through the keypad as actual data, but rather generates the coordinates corresponding to a region selected by the pointer as actual data by moving the pointer to the data inputted through the keypad.

When the mobile terminal transmits an image to the corresponding terminal in a video call mode, the remote control managing unit 102 uses the image normalizing unit 104 to convert the image into a predetermined video call format. In this context, the image normalizing unit 104 determines a normalization ratio for converting the image into the predetermined video call format and stores the normalization ratio in the storage unit 130. Herein, the normalization ratio may be expressed according to Equation 1:

$$N\_W = \text{Width of LCD Buffer}/\text{Width of Video Call Format}$$

$$N\_H = \text{Height of LCD Buffer}/\text{Height of Video Call Format} \quad [\text{Eqn. 1}]$$

where N_W denotes the normalization ratio for width, N_H denotes the normalization ratio for height, Width of LCD Buffer denotes the width according to the screen resolution of the terminal, and Height of LCD Buffer denotes the height according to the screen resolution of the terminal.

When the mobile terminal receives a control message for a remote control from the corresponding terminal in the video call mode, the remote control managing unit 102 analyzes the control data included in the control message and controls a function for performing a relevant operation. Herein, if the actual data included in the control message is (x, y) coordinates, the remote control managing unit 102 converts the (x, y) coordinates into the coordinates of the original image through the control data converting unit 106 by using the normalization ratio stored in the storage unit 130. That is, because the (x, y) coordinates included in the control message are the coordinates of an image whose size is converted according to a video call format, they are converted into the coordinates corresponding to the screen resolution of the terminal. Herein, the remote control managing unit 102 may use the normalization ratio to convert the received coordinates into the coordinates of the original image according to Equation 2:

$$\text{Original}(X) = N\_W \times \text{Re sized}(X)$$

$$\text{Original}(Y) = N\_H \times \text{Re sized}(Y) \quad [\text{Eqn. 2}]$$

where Original(X) and Original(Y) denote the coordinates of the original image, N_W and N_H denote the normalization ratios, and Re sized(X) and Re sized(Y) denote the received coordinates.

The display unit 110 displays numerals, characters, various images, and status information generated during an operation of the mobile terminal. According to an embodiment of the present invention, under the control of the control unit 100, the display unit 110 displays images received from the corresponding terminal during a video call mode. Also, under the control of the remote control managing unit 102, the display unit 110 displays a keypad or a pointer on the screen.

The input unit 120 includes a keypad including at least one key or a touch sensor for sensing a touch of the user. The input unit 120 provides the control unit 100 with the data corresponding to a key pressed by the user or the coordinates corresponding to a touch position of the user.

The storage unit 130 stores data and programs for an overall operation of the mobile terminal and temporarily stores data that are generated during the operation of the mobile terminal. Also, the storage unit 130 stores the normalization ratio under the control of the remote control managing unit 102.

The communication unit 140 processes data that are communicated over radio channels. During a transmitting (TX) mode, the communication unit 140 receives a baseband signal from the control unit 100, up-converts the baseband signal into a radio frequency (RF) signal, and transmits the RF signal over a radio channel through an antenna. During a receiving (RX) mode, the communication unit 140 receives an RF signal from the antenna, down-converts the RF signal into a baseband signal, and provides the baseband signal to the control unit 100.

Figure 3:
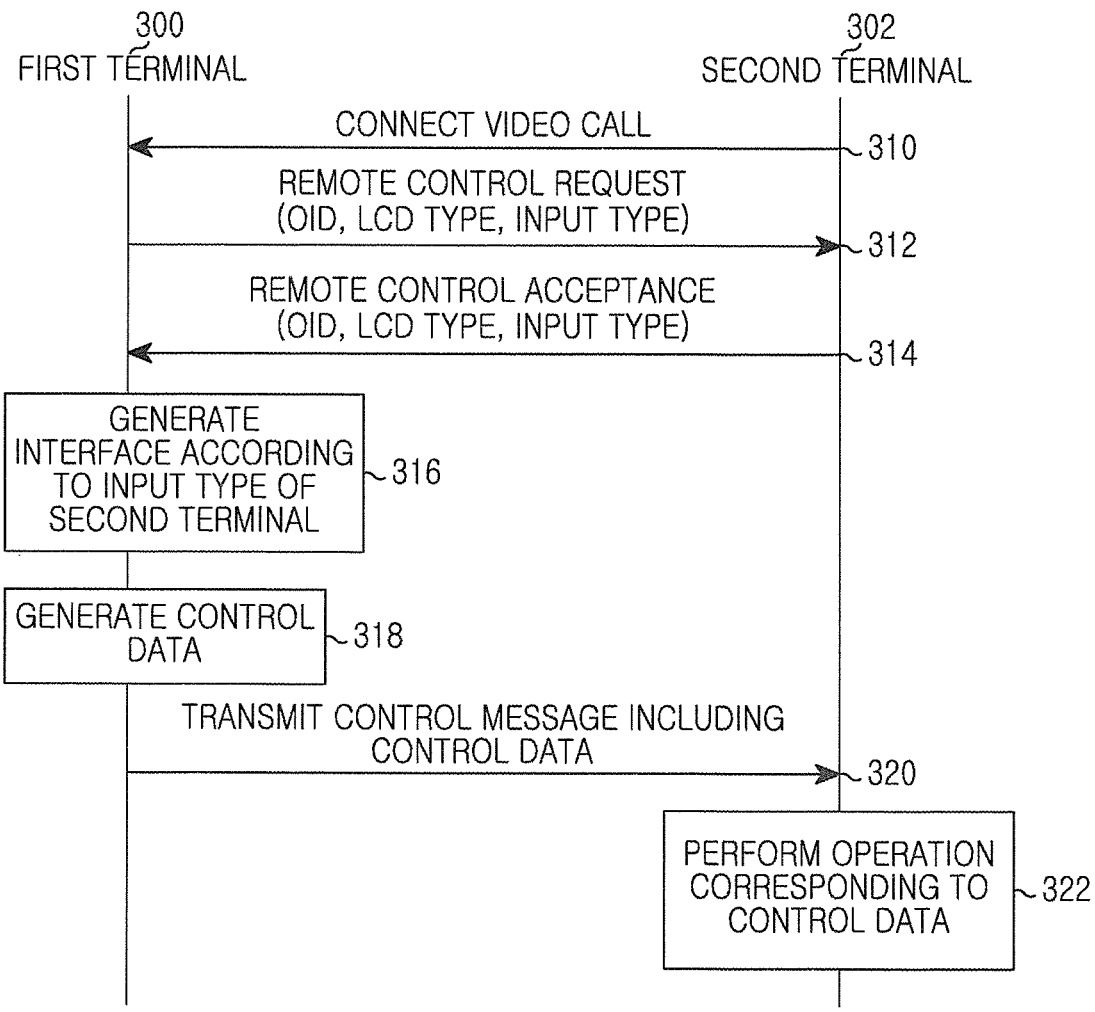
FIG. 3 illustrates a remote control signaling process between mobile terminals according to an embodiment of the present invention.

FIG. 3 illustrates a remote control signaling process between mobile terminals according to an embodiment of the present invention. Herein, it is assumed that a first terminal 300 remotely controls a second terminal 302. A description of a typical operation that is performed during the video call, for example, an operation of converting the size of an image according to a video call format prior to communication between the first terminal 300 and the second terminal 302, will be omitted for conciseness.

Referring to FIG. 3, the first terminal 300 and the second terminal 302 connect a video call according to a general video call connection process in step 310.

In step 312, the first terminal 300 transmits a remote control request message to the second terminal 302 in order to remotely control the second terminal 302. Herein, the remote control request message includes input type information, screen resolution information, and OID (Object ID) information of the first terminal 300. Herein, if the input unit of the first terminal 300 is a keypad, the remote control request message may indicate that the input type of the first terminal 300 is a keypad and may also indicate the type of the keypad. For example, the remote control request message may also indicate whether the keypad of the first terminal 300 is a 3×4 keypad or a QWERTY keypad.

When receiving the remote control request message from the first terminal 300, the second terminal 302 may display the remote control request message of the first terminal 300 on the screen such that the user may input remote control acceptance/rejection data into the second terminal 302. When the user inputs remote control acceptance data into the second terminal 302, the second terminal 302 transmits a remote control acceptance message to the first terminal 300 in step 314. Herein, the remote control acceptance message includes input type information, screen resolution information, and OID information of the second terminal 302. Also, if the input unit of the second terminal 302 is a keypad, the remote control acceptance message may indicate that the input type of the second terminal 302 is a keypad and may also indicate the type of the keypad.

In step 316, the first terminal 300 generates an interface according to the input type of the second terminal 302. That is, the first terminal 300 obtains the input type of the second terminal 302 from the remote control acceptance message, compares the input type of the second terminal 302 with the input type of the first terminal 300, and generates an interface for the input type of the second terminal 302 if the input type of the second terminal 302 is not identical to the input type of the first terminal 300. For example, if the input type of the first terminal 300 is a touch sensor and the input type of the second terminal 302 is a keypad, the first terminal 300 displays the keypad of the second terminal 302 on the screen. If the input type of the first terminal 300 is a keypad and the input type of the second terminal 302 is a touch sensor, the first terminal 300 displays a pointer on the screen. If the first terminal 300 and the second terminal 302 have the same input type, the operation of step 316 is omitted.

In step 318, the first terminal 300 generates control data according to a user input. In step 320, the first terminal 300 transmits a control message including the control data to the second terminal 302. Herein, as illustrated in FIG. 2, the control message may include a Length field 201 indicating the total data length, a Sequence Number field 203 indicating the message order, a Key Type field 205 indicating the input type of the terminal, a Drag field 207 indicating the occurrence/nonoccurrence of a drag, a Drag Start/End field 209 indicating the start or end of a drag, and an (x, y) Coordinate or Key Value field 211 indicating actual data inputted by the user. Herein, if the input type of the second terminal 302 is identical to the input type of the first terminal 300, the first terminal 300 determines the data generated according to a user input as the control data and includes the same in the control message. In contrast, if the input type of the second terminal 302 is different from the input type of the first terminal 300, the first terminal 300 converts the generated data corresponding to the user input according to the input type of the second terminal 302, and includes the same in the control message.

For example, if the input type of the second terminal 302 is a keypad and the input type of the first terminal 300 is a touch sensor, the first terminal 300 does not generate the coordinates of a touch position as actual data through the touch sensor, but rather generates a key corresponding to the touch position in the keypad displayed on the screen as actual data to be included in the control message. In contrast, if the input type of the second terminal 302 is a touch sensor and the input type of the first terminal 300 is a keypad, the first terminal 300 does not generate the data inputted through the keypad as actual data, but rather generates the coordinates, corresponding to a region selected by a pointer displayed on the screen, as actual data by moving the pointer to the data inputted through the keypad.

In step 322, when receiving the control message from the first terminal 300, the second terminal 302 obtains control data from the control message and performs an operation corresponding to the control data. Herein, if the actual data included in the control message are (x, y) coordinates, the second terminal 302 converts the (x, y) coordinates into the coordinates of the original image by using the normalization ratio determined by Equation 1. That is, because the (x, y) coordinates included in the control message are the coordinates of an image whose size is converted according to a video call format, they are converted into the coordinates corresponding, to the screen resolution of the first terminal 300. Herein, the second terminal 302 may use the normalization ratio to convert the received (x, y) coordinates into the coordinates of the original image as Equation 2.

Figure 4:
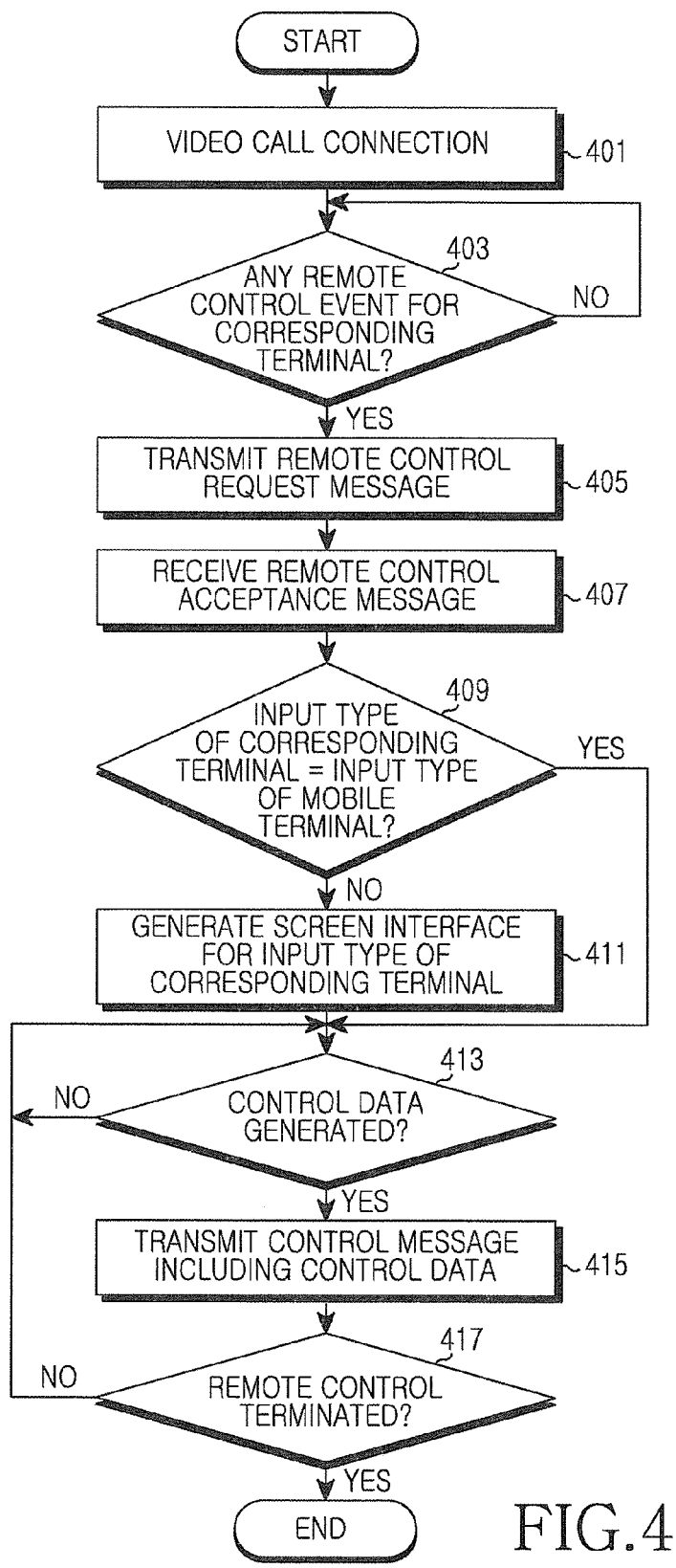
FIG. 4 illustrates a process for performing a remote control in a mobile terminal according to an embodiment of the present invention.

FIG. 4 illustrates a process for performing a remote control in a mobile terminal according to an embodiment of the present invention.

Referring to FIG. 4, when a video call is connected with a corresponding terminal in step 401, the mobile terminal determines, in step 403, whether a remote control event for the corresponding terminal occurs. If a remote control event for the corresponding terminal has occurred, the mobile terminal proceeds to step 405. In step 405, the mobile terminal generates a remote control request message and transmits the remote control request message to the corresponding terminal. The remote control request message may include input type information, screen resolution information, and OID information of the mobile terminal. If the input unit of the mobile terminal is a keypad, the remote control request message may indicate that the input type of the mobile terminal is a keypad and may also indicate the type of the keypad (e.g., a 3×4 keypad or a QWERTY keypad).

In step 407, the mobile terminal receives a remote control acceptance message from the corresponding terminal. In step 409, the mobile terminal determines whether the input type of the corresponding terminal is identical to the input type of the mobile terminal. According to an embodiment, the remote control acceptance message may include input type information, screen resolution information, and OID information of the corresponding terminal. Also, if the input unit of the corresponding terminal is a keypad, the remote control acceptance message may indicate that the input type of the corresponding terminal is a keypad and may also indicate the type of the keypad.

If the input type of the corresponding terminal is identical to the input type of the mobile terminal, the mobile terminal proceeds directly to step 413. Otherwise, the mobile terminal proceeds to step 411. In step 411, the mobile terminal generates a user interface according to the input type of the corresponding terminal and displays the user interface on the screen. For example, if the input type of the mobile terminal is a touch sensor and the input type of the corresponding terminal is a keypad, the mobile terminal may display the keypad of the corresponding terminal on the screen. If the input type of the mobile terminal is a keypad and the input type of the corresponding terminal is a touch sensor, the mobile terminal may display a pointer on the screen.

In step 413, the mobile terminal determines whether control data are generated according to a user input. That is, the mobile terminal may determine whether an input for remotely controlling the mobile terminal is generated by the user. If control data are generated according to a user input, the mobile terminal proceeds to step 415. In step 415, the mobile terminal generates a control data including the generated control data and transmits the control message to the corresponding terminal. As illustrated in FIG. 2, the control message may include a Length field 201 indicating the total data length, a Sequence Number field 203 indicating the message order, a Key Type field 205 indicating the input type of the terminal, a Drag field 207 indicating the occurrence/nonoccurrence of a drag, a Drag Start/End field 209 indicating the start or end of a drag, and an (x, y) Coordinate or Key Value field 211 indicating actual data inputted by the user. According to an embodiment, if the input type of the corresponding terminal is identical to the input type of the mobile terminal, the mobile terminal may determine the data generated according to a user input as the control data and include the same in the control message. In contrast, if the input type of the corresponding terminal is different from the input type of the mobile terminal, the mobile terminal converts the generated data corresponding to the user input according to the input type of the corresponding terminal, and includes the same in the control message. For example, if the input type of the corresponding terminal is a keypad and the input type of the mobile terminal is a touch sensor, the mobile terminal does not generate the coordinates of a touch position as actual data through the touch sensor, but rather generates a key corresponding to the touch position in the keypad displayed on the screen as actual data to be included in the control message. In contrast, if the input type of the corresponding terminal is a touch sensor and the input type of the mobile terminal is a keypad, the mobile terminal does not generate the data inputted through the keypad as actual data, but rather generates the coordinates, corresponding to a region selected by a pointer displayed on the screen, as actual data by moving the pointer to the data inputted through the keypad.

In step 417, the mobile terminal determines whether a remote control termination event is generated. If a remote control termination event is not generated, the mobile terminal returns to step 413. In contrast, if a remote control termination event is generated, the mobile terminal ends the process according to an embodiment of the present invention. According to an embodiment, the remote control termination event may be generated by the user of the mobile terminal or at the request of the corresponding terminal.

Figure 5:
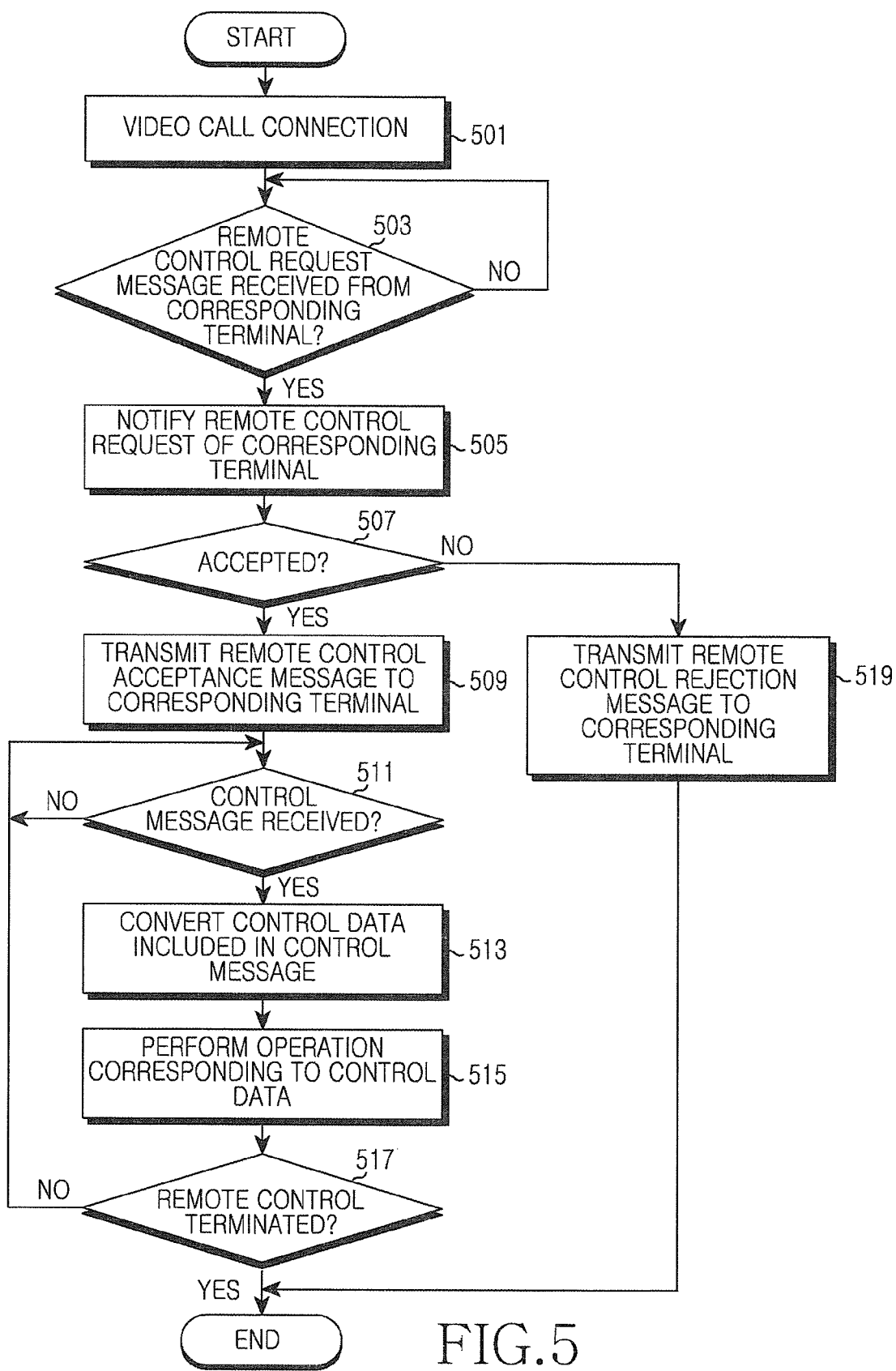
FIG. 5 illustrates a process for undergoing a remote control in a mobile terminal according to an embodiment of the present invention.

FIG. 5 illustrates a process for undergoing a remote control in a mobile terminal according to an embodiment of the present invention.

Referring to FIG. 5, when a video call is connected with a corresponding terminal in block 501, the mobile terminal determines, in step 503, whether a remote control request message is received from the corresponding terminal. According to an embodiment, the remote control request message may include input type information, screen resolution information, and OID information of the corresponding terminal. If the input unit of the corresponding terminal is a keypad, the remote control request message may indicate that the input type of the corresponding terminal is a keypad and may also indicate the type of the keypad (e.g., a 3×4 keypad or a QWERTY keypad).

When receiving the remote control request message from the corresponding terminal, the mobile terminal proceeds to step 505. In step 505, the mobile terminal outputs a remote control request notification message. In step 507, the mobile terminal determines whether the remote control request is accepted by the user. If the remote control request is not accepted by the user, the mobile terminal proceeds step 519. In step 519, the mobile terminal transmits a remote control rejection message to the corresponding terminal. Thereafter, the mobile terminal ends the algorithm according to the present invention.

If the remote control request is accepted by the user, the mobile terminal proceeds step 509. In step 509, the mobile terminal transmits a remote control acceptance message to the corresponding terminal. According to an embodiment, the remote control acceptance message may include input type information, screen resolution information, and OID information of the mobile terminal. If the input unit of the mobile terminal is a keypad, the remote control acceptance message may indicate that the input type of the mobile terminal is a keypad and may also indicate the type of the keypad.

In step 511, the mobile terminal determines whether a control message is received from the corresponding terminal. If a control message is received from the corresponding terminal, the mobile terminal proceeds to step 513. In step 513, the mobile terminal converts control data included in the control message. In step 515, the mobile terminal performs an operation corresponding to the control data. Herein, if the actual data included in the control message are (x, y) coordinates, the mobile terminal converts the (x, y) coordinates into the coordinates of the original image by using the normalization ratio determined by Equation 1. That is, because the (x, y) coordinates included in the control message is the coordinates of an image whose size is converted according to a video call format, they are converted into the coordinates corresponding to the screen resolution of the mobile terminal. According to an embodiment, the mobile terminal may use the normalization ratio to convert the received (x, y) coordinates into the coordinates of the original image according to Equation 2. According to an embodiment, if the actual data included in the control message is a key value, the mobile terminal may omit step 513 and perform an operation corresponding to the key value in step 515.

In step 517, the mobile terminal determines whether a remote control termination event is generated. If a remote control termination event is not generated, the mobile terminal returns to step 511. In contrast, if a remote control termination event is generated, the mobile terminal ends the algorithm according to the present invention. According to an embodiment, the remote control termination event may be generated by the user of the mobile terminal or at the request of the corresponding terminal.

According to an embodiment, the remotely-controlled terminal converts the coordinates included in the received control message into the coordinates of the original image. However, the remotely-controlling terminal may convert the coordinates generated according to a user input into the coordinates of the original image and may transmit the control message including the same to the remotely-controlled terminal. That is, the remotely-controlling terminal may determine the normalization ratio from the screen resolution information of the mobile terminal included in the remote control acceptance message to convert the coordinates generated according to the user input into the coordinates of the original image of the remotely-controlled terminal.

As described above, the present invention uses a control channel to perform a remote control between mobile terminals in a video call mode, thereby making it possible to perform a remote connection and control even when the communication service provider does not support a logical channel. Also, the present invention considers the user interface of the corresponding terminal, thereby making it possible to perform a remote control even between mobile terminals with different user interfaces.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not only by the detailed description of the invention but by the appended claims, and all differences within the scope will be construed as being included in the present invention.

What is claimed is:

1. A method for performing a remote control in a mobile terminal, the method comprising:
   connecting a video call with a corresponding terminal;
   transmitting a remote control request message to the corresponding terminal;
   receiving a remote control acceptance message from the corresponding terminal;
   obtaining input type information of the corresponding terminal from the remote control acceptance message;
   displaying a user interface on a screen based on the input type information; and
   transmitting a control message including control data that corresponds to a user data inputted through the user interface to the corresponding terminal.

2. The method of claim 1, wherein the remote control request message and the remote control acceptance message include one or more of input type information, screen resolution information, and OID (Object Identification) information of the respective terminal.

3. The method of claim 1, further comprising:
   comparing an input type of the mobile terminal and an input type of the corresponding terminal; and
   generating the user interface according to the input type of the corresponding terminal if the input type of the corresponding terminal is different from the input type of the mobile terminal.

4. The method of claim 1, wherein displaying the user interface on the screen comprises:
   displaying a pointer on the screen if the input type of the corresponding terminal is a touch sensor; and
   displaying a keypad of the corresponding terminal on the screen if the input type of the corresponding terminal is a keypad.

5. The method of claim 1, wherein the control message comprises one or more of a length field indicating the total data length, a sequence number field indicating a message order, a key type field indicating the input type of the mobile terminal, a drag field indicating whether a drag has occurred, a drag endpoint field indicating one of a start and an end of a drag, and a value field that corresponds to actual data inputted by the user.

6. The method of claim 5, wherein transmitting the control message including the control data corresponding to the user data to the corresponding terminal comprises converting the actual data inputted by the user into data corresponding to the input type of the corresponding terminal.

7. A method for undergoing a remote control in a mobile terminal, the method comprising:
   connecting a video call with a corresponding terminal;
   receiving a remote control request message from the corresponding terminal;
   transmitting a remote control acceptance message including input type information of the mobile terminal to control a user interface of the corresponding terminal to the corresponding terminal;
   receiving a control message including control data that corresponds to a user input from the corresponding terminal; and
   performing an operation corresponding to the control data.

8. The method of claim 7, wherein the remote control request message and the remote control acceptance message include one or more of input type information, screen resolution information, and OID (Object Identification) information of the respective terminal.

9. The method of claim 7, wherein the control message comprises one or more of a length field indicating the total data length, a sequence number field indicating a message order, a key type field indicating the input type of the corresponding terminal, a drag field indicating whether a drag has occurred, a drag endpoint field indicating one of a start and an end of a drag, and a value field that corresponds to actual data inputted by the user of the corresponding terminal.

10. The method of claim 9, further comprising:
    obtaining a normalization ratio according to the video call format and the screen resolution of the mobile terminal if the value field of the control message includes a coordinate value inputted by the user; and
    using the normalization ratio to convert the coordinate value into the coordinates corresponding to the screen resolution of the mobile terminal.

11. An apparatus for performing a remote control in a mobile terminal, the apparatus comprising:
    a communication unit configured to connect a video call with a corresponding terminal; and
    a control unit configured to transmit a remote control request message to the corresponding terminal, receive a remote control acceptance message from the corresponding terminal, obtain input type information of the corresponding terminal from the remote control acceptance message, display a user interface on a screen based on the input type information, and transmit a control message including control data that corresponds to a user data inputted through the user interface to the corresponding terminal.

12. The apparatus of claim 11, wherein the remote control request message and the remote control acceptance message include one or more of input type information, screen resolution information, and OID (Object Identification) information of the respective terminal.

13. The apparatus of claim 11,
    wherein the control unit is further configured to compare an input type of the mobile terminal and an input type of the corresponding terminal, and generate the user interface according to the input type of the corresponding terminal if the input type of the corresponding terminal is different from the input type of the mobile terminal.

14. The apparatus of claim 11, wherein a pointer is displayed on the screen if the input type of the corresponding terminal is a touch sensor, and a keypad of the corresponding terminal is displayed on the screen if the input type of the corresponding terminal is a keypad.

15. The apparatus of claim 11, wherein the control message includes one or more of a length field indicating the total data length, a sequence number field indicating a message order, a key type field indicating the input type of the mobile terminal, a drag field indicating whether a drag has occurred, a drag endpoint field indicating one of a start and an end of a drag, and a value field that corresponds to actual data inputted by the user.

16. The apparatus of claim 15, wherein the control unit is further configured to convert the actual data inputted by the user into data corresponding to the input type of the corresponding terminal.

17. An apparatus for undergoing a remote control in a mobile terminal, the apparatus comprising:
    a communication unit configured to connect a video call with a corresponding terminal; and
    a control unit configured to receive a remote control request message from the corresponding terminal, transmit a remote control acceptance message including input type information of the mobile terminal to control a user interface of the corresponding terminal to the corresponding terminal, receive a control message including control data that corresponds to a user input from the corresponding terminal, and perform an operation corresponding to the control data.

18. The apparatus of claim 17, wherein the remote control request message and the remote control acceptance message include one or more of input type information, screen resolution information, and OID (Object Identification) information of the respective terminal.

19. The apparatus of claim 17, wherein the control message includes one or more of a length field indicating a total data length, a sequence number field indicating a message order, a key type field indicating the input type of the corresponding terminal, a drag field indicating whether a drag has occurred, a drag endpoint field indicating one of a start and an end of a drag, and a value field that corresponds to actual data inputted by the user.

20. The apparatus of claim 19, wherein if the control message includes a coordinate value inputted by the user, the control unit is further configured to obtain a normalization ratio according to the video call format and the screen resolution of the mobile terminal if the value field of the control message includes a coordinate value inputted by the user, and use the normalization ratio to convert the coordinate value into the coordinates corresponding to the screen resolution of the mobile terminal.

* * * * *